(12) United States Patent
Lin et al.

(10) Patent No.: US 8,702,340 B2
(45) Date of Patent: Apr. 22, 2014

(54) INTEGRATED LINEAR AND ROTARY LOCKING DEVICE

(75) Inventors: Yhu-Tin Lin, Rochester Hills, MI (US); Andrew L. Bartos, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 628 days.

(21) Appl. No.: 12/976,740

(22) Filed: Dec. 22, 2010

(65) Prior Publication Data

US 2011/0182655 A1 Jul. 28, 2011

Related U.S. Application Data

(60) Provisional application No. 61/298,679, filed on Jan. 27, 2010.

(51) Int. Cl.
*B25G 3/20* (2006.01)

(52) U.S. Cl.
USPC ............... 403/350; 403/31; 403/325; 901/30

(58) Field of Classification Search
USPC ............ 403/31, 109.3, 109.8, 320, 325, 350, 403/351; 901/30, 40; 414/744.4, 752.1; 70/174, 189; 294/65
See application file for complete search history.

(56) References Cited

U.S. PATENT DOCUMENTS

| | | | | |
|---|---|---|---|---|
| 2,787,353 A | | 4/1957 | Spraragen | |
| 4,177,887 A | * | 12/1979 | Kellett et al. | 192/223.2 |
| 5,115,889 A | * | 5/1992 | Fortmann et al. | 188/67 |
| 5,746,567 A | * | 5/1998 | Herbermann et al. | 414/749.6 |
| 5,899,294 A | * | 5/1999 | Shimizu et al. | 180/444 |
| 5,979,267 A | * | 11/1999 | Yonezawa | 74/531 |
| 6,112,863 A | * | 9/2000 | Colletti | 188/77 R |
| 6,367,789 B1 | * | 4/2002 | Bernhardt et al. | 269/74 |
| 6,474,899 B1 | * | 11/2002 | Corradi | 403/322.1 |
| 6,511,255 B1 | * | 1/2003 | Mainardi | 403/365 |
| 7,131,518 B2 | * | 11/2006 | Weiss | 188/67 |
| 7,370,570 B2 | * | 5/2008 | Nakata et al. | 91/43 |
| 2004/0110594 A1 | * | 6/2004 | Goto | 475/150 |
| 2005/0039555 A1 | * | 2/2005 | Kerian | 74/55 |
| 2009/0288458 A1 | | 11/2009 | Lin | |

FOREIGN PATENT DOCUMENTS

JP 2008-184765 A 8/2008
WO WO 02/43930 A1 6/2002

* cited by examiner

*Primary Examiner* — Gregory Binda
*Assistant Examiner* — Nahid Amiri
(74) *Attorney, Agent, or Firm* — John A. Miller; Miller IP Group, PLC

(57) ABSTRACT

An integrated locking device that includes both a linear locking mechanism and a rotary locking mechanism. The locking device includes a housing where the linear locking mechanism and the rotary locking mechanism are mounted to different sides of the housing so as to reduce the height of the device.

19 Claims, 8 Drawing Sheets

INTEGRATED LINEAR AND ROTARY LOCKING DEVICE

CROSS-REFERENCE TO RELATED APPLICATIONS

This application claims the benefit of the filing date of provisional application 61/298,679, titled, Integrated Linear and Rotary Locking Device, filed Jan. 27, 2010.

BACKGROUND OF THE INVENTION

1. Field of the Invention

This invention relates generally to an integrated linear and rotary locking device and, more particularly, to an integrated linear and rotary locking device that includes a linear locking mechanism provided on one side of a device housing and a rotary locking mechanism provided on a different side of the device housing so as to reduce the device height.

2. Discussion of the Related Art

Manufacturing and assembly facilities typically employ robots having robotic arms that perform a variety of operations, such as welding parts, moving parts from one location to another location, installing parts, painting parts, etc. The robotic arm needs some device or devices that allow it to easily grasp the particular part for the particular operation. These devices are known in the art as end-effectors. An end-effector typically has a center boom and multiple rods extending therefrom that support a plurality of vacuum cups that pick up and hold parts when a vacuum is applied. Generally, the end-effector is built manually with various modular components, so that each vacuum cup can engage the part at a specific position and orientation.

Currently, end-effectors that are employed in manufacturing environments are designed for a specific part or a limited number of parts. Therefore, when the robot is used for different tasks, one end-effector typically needs to replace another end-effector or the position of the vacuum cups need to be changed. Typically, it is a slow and tedious process to set up the end-effectors due to numerous tightening, loosening and adjustments of the various end-effector components. As a result, in production, a long rack of pre-built sub-assemblies, also referred to as spiders of the end-effectors, are stocked for different parts and operations. Thus, the end-effectors take up a significant amount of floor space, a significant amount of inventory, can be lost, etc.

For agile reconfigurable tooling of the type discussed above, locking devices are typically the key enablers for changing the configuration of tooling components. Locking devices need to be quickly unlocked using a suitable actuation device to allow for smooth repositioning of the tooling components to a desired configuration, and then remain securely locked at the release of actuation. Each reconfigurable tooling normally utilizes an assortment of linear and rotary locking devices. For the ease and speed of reconfiguration, it would be best to have multiple locking devices combined or integrated such that they can be locked and unlocked in one actuation operation. An integrated locking device also saves the space and mass of the agile reconfigurable tooling.

SUMMARY OF THE INVENTION

In accordance with the teachings of the present invention, an integrated locking device is disclosed that includes both a linear locking mechanism and a rotary locking mechanism. The locking device includes a housing where the linear locking mechanism and the rotary locking mechanism are mounted to different sides of the housing so as to reduce the height of the device.

Additional features of the present invention will become apparent from the following description and appended claims, taken in conjunction with the accompanying drawings.

BRIEF DESCRIPTION OF THE DRAWINGS

FIG. 7 is a cross-sectional view along a center plane of a rotary locking mechanism in the locking device shown in FIG. 5;

DETAILED DESCRIPTION OF THE EMBODIMENTS

The following discussion of the embodiments of the invention directed to an integrated locking device including a linear locking mechanism and a rotary locking mechanism is merely exemplary in nature, and is in no way intended to limit the invention or its applications or uses. Particularly, the integrated locking device of the invention has particular application for a tool module that is part of an end-effector associated with a robotic arm. However, as will be appreciated by those skilled in the art, the integrated locking device will have application for other uses, including, but not limited to, applications for machinery, instrumentation and fixtures that need quick and accurate reconfiguration.

Figure 1:
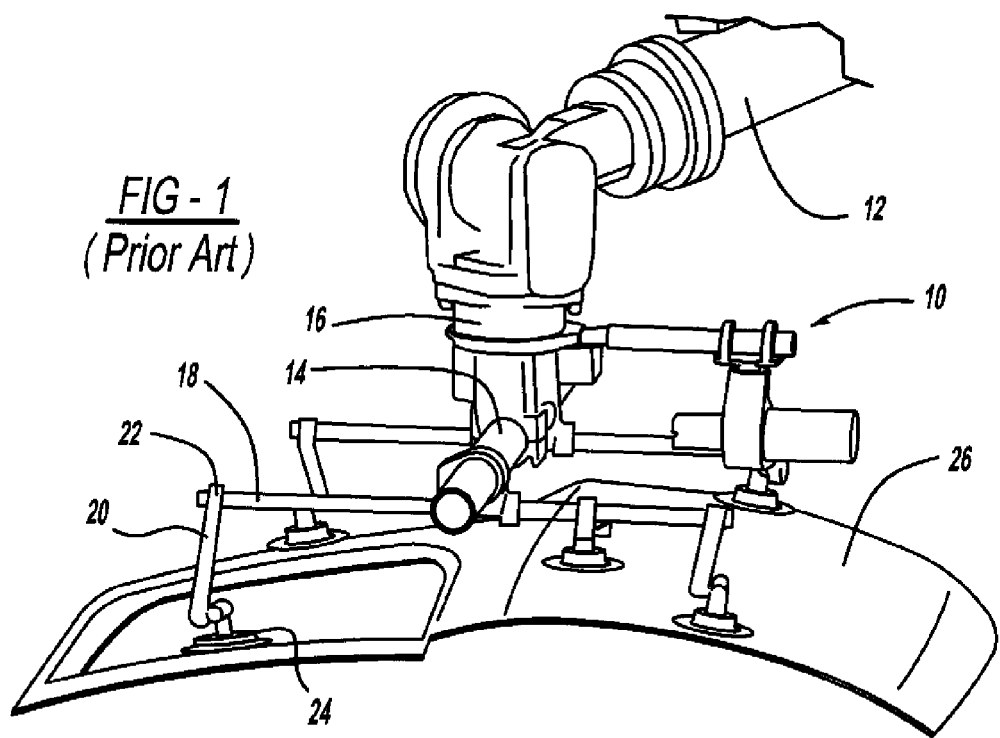
FIG. 1 is a perspective view of an end of a robot arm including an end-effector attached thereto where the end-effector is secured to a part.

FIG. 1 is a perspective view of an end-effector 10 mounted to a robot arm 12 of the type known in the art. The end-effector 10 includes a center boom 14 that is coupled to a coupling mechanism 16 at the end of the robot arm 12 in a manner that is well understood to those skilled in the art. The end-effector 10 includes a plurality of end-effector rods 18 secured to the boom 14, as shown. A plurality of tool modules 20 are positionable along the rod 18 and locked by conventional pinch clamps 22. An opposite end of the tool module 20 includes a suction or vacuum cup 24 that allows the end-effector 10 to be securely coupled to a part 26.

Figure 2:
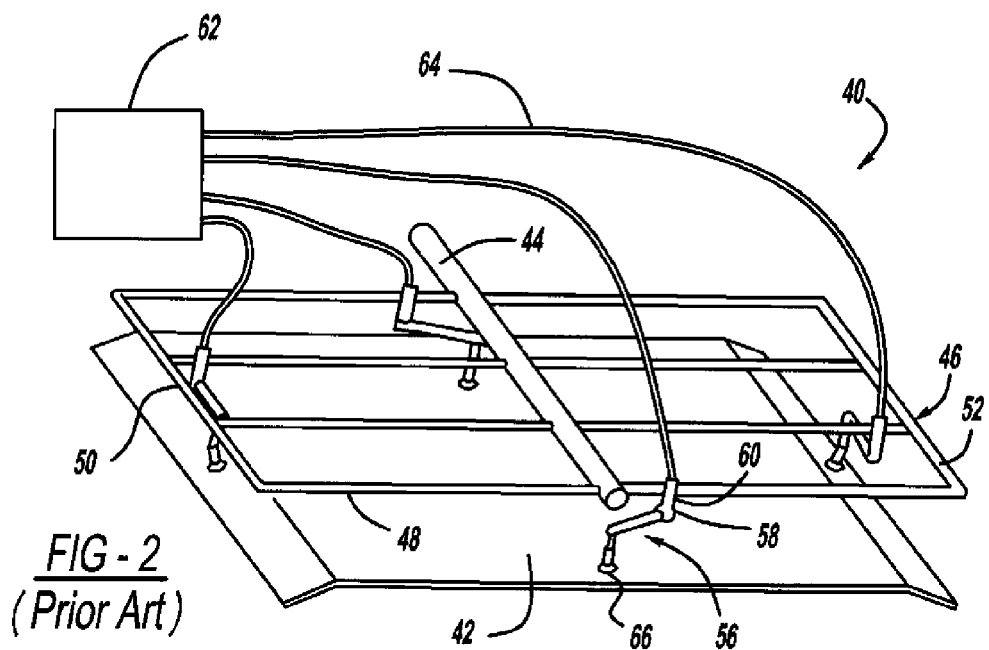
FIG. 2 is a perspective view of an end-effector including tool modules attached thereto, where the tool modules are secured to a part.

FIG. 2 is a perspective view of an end-effector 40 that can replace the end-effector 10. The end-effector 40 includes a main beam 44 that can be coupled to the coupler 16 of the robot arm 12. The main beam 44 is part of an end-effector frame 46 that includes a plurality of cross rods 48 connected to opposing end bars 50 and 52. The end-effector 40 also includes a plurality of tool modules 56 having a plurality of joints 58 that allow the tool module 56 to be coupled to the rods 48 in various orientations. The tool module 56 includes a linear locking mechanism 60 through which the rod 48 extends so that the tool module 56 can be secured or locked at any location along the rod 48 on which it is mounted. The tool module 56 also includes a suction cup 66 that grasps the part 42. An air source 62 provides pneumatic air to the tool modules 56 on lines 64 locking and unlocking the locking mechanisms on the tool modules 56 and providing suction for the suction cups 66.

Figure 3:
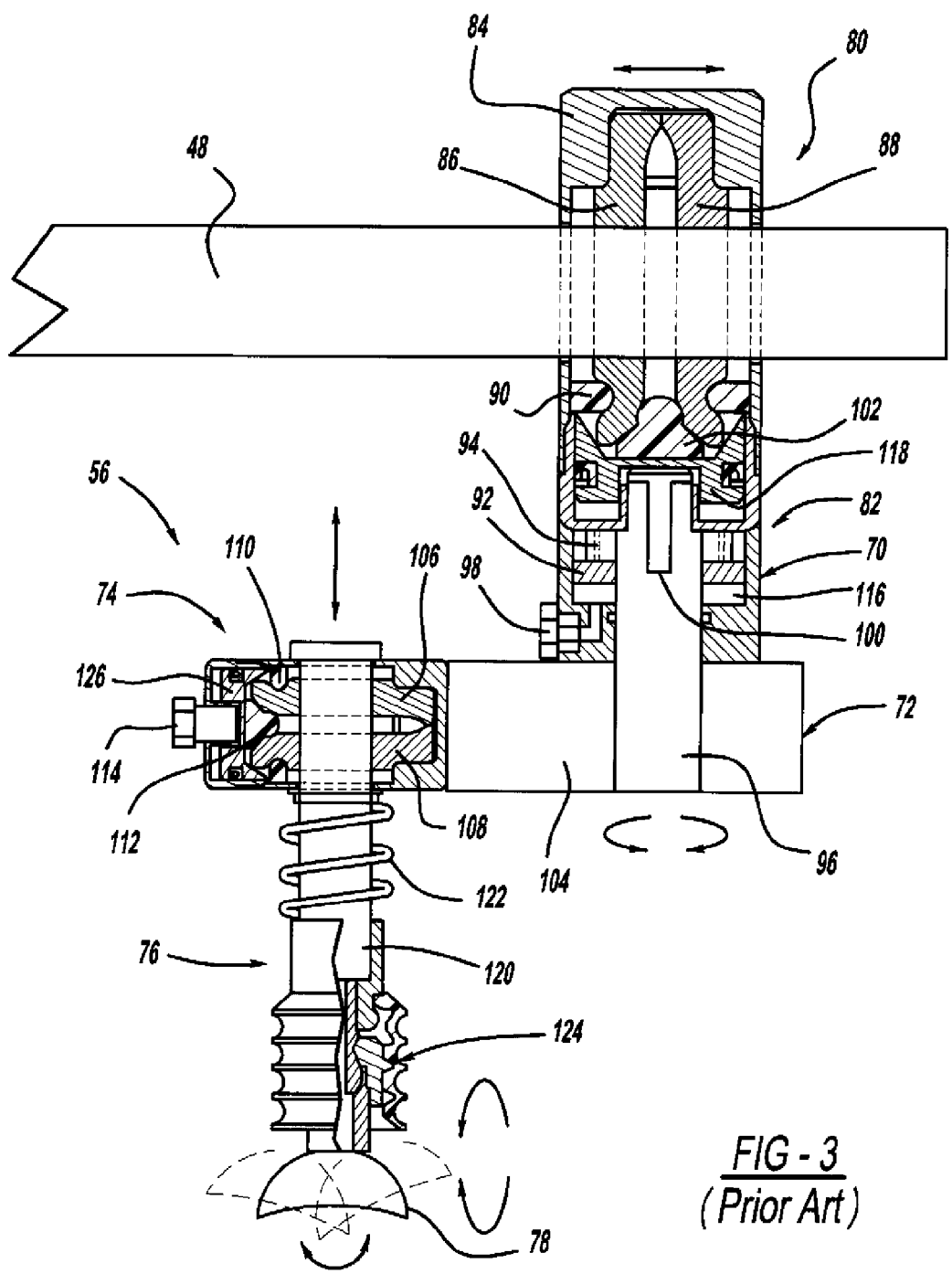
FIG. 3 is a cross-sectional view of one of the tool modules shown in FIG. 2.

FIG. 3 is a cross-sectional view of one of the tool modules 56 mounted to one of the cross rods 48. The tool module 56 can be easily reconfigurable on the rod 48 with or without automation. The tool module 56 includes three major components, namely, an integrated linear and rotary locking assembly 70, a swing arm assembly 72 and a spring-loaded vacuum cup assembly 76 including a vacuum cup 78. When these three components are unlocked, a five degree-of-freedom reconfiguration of the vacuum cup 78 can be provided for any position and any orientation within the reach of the component design, as illustrated by the arrows.

The integrated linear and rotary locking assembly 70 includes a linear locking mechanism 80 and a rotary locking mechanism 82 mounted in a common housing 84. Although the linear locking mechanism 80 and the rotary locking mechanism 82 are shown and described herein as been part of the same assembly. As will be appreciated by those skilled in the art, the linear locking mechanism 80 and the rotary locking mechanism 82 can be packaged separately for different applications. The linear locking mechanism 80 includes opposing locking plates 86 and 88 that are pushed together by an annular spring element 90 that cause the plates 86 and 88 to be cocked relative to each other and lock onto the rod 48. The rotary locking mechanism 82 includes a locking plate 92 held in a locked position by a spring 94 that prevents a shaft 96 from rotating. When pneumatic air is provided to an inlet port 98, a pushing element 100 pushes against a piston 118 which pushes against a separating element 102 positioned between the locking plates 86 and 88 that causes the plates 86 and 88 to push against the bias of the spring element 90 and unbind the plates 86 and 88 so that they disengage from the rod 48 and are unlocked. Additionally, the pneumatic air provides pressure into a chamber 116 that pushes the plate 92 against the bias of the spring 94. Movement of the plate 92 unlocks the rotary locking mechanism 82 so that the shaft 96 can rotate.

The swing arm assembly 72 includes a swing arm 104 that is rigidly mounted to the shaft 96, such as by splines, so that when the shaft 96 rotates, the swing arm 104 also rotates. The swing arm assembly 72 also includes a linear locking mechanism 74 having opposing locking plates 106 and 108, an annular spring element 110, a piston 126 and a separating member 112, similar to the locking mechanism 80. An unlocking device 114, which can be manually or pneumatically controlled, is operable to cause the separating member 112 to separate and unlock the locking plates 106 and 108.

The vacuum cup assembly 76 includes a shaft 120 that is coupled to the linear locking mechanism 74. The shaft 120 is compression loaded by a spring 122 so that if the locking mechanism 74 is unlocked, the bias of the spring 122 causes the shaft 120 to drop and the cup 78 to go to its lowest position. The shaft 120 can be raised against the bias of the spring 122, and the mechanism 74 can be locked to hold the cup 78 at a range of Z positions. The assembly 76 also includes a universal or ball joint 124 linking the cup 78 to the spring-loaded shaft 120. The cup 78 is free to rotate on the ball joint 124 where there is no locking mechanism.

In operation, the linear locking mechanism 80 and the rotary locking mechanism 82 in the integrated locking assembly 70 can be unlocked with the push of a mechanical engagement or pneumatic actuation. The unlocked assembly 70 allows the swing arm assembly 72 to be located at a desired X-Y position by sliding and rotating the integrating locking assembly 70. The integrated locking assembly 70 is then locked by releasing the mechanical engagement or pneumatic actuation. The linear locking mechanism 74 on the swing arm assembly 72 is then unlocked mechanically or with compressed air. The vacuum cup 78 can then be pressed against a hard surface so that the shaft 120 moves upward through the locking mechanism 74 a sufficient distance in the Z direction so that the vacuum cup 78 will not touch a work piece in the programmed manipulation of the end-effector 40. Afterwards, the compressed air is discharged to lock the vacuum cup 78 at the raised Z position through the linear locking mechanism 74.

The end-effector 40 can be used for a multitude of different parts. Some parts will require a certain number of the tool modules 56 and other parts may require a different number of the tool modules 56. Those tool modules 56 that may not be needed for a particular part remain attached to the end-effector 40, but unused. When the end-effector 40 is used to pick up a part, the linear locking mechanisms 74 for those vacuum cups 78 for those tool modules that are needed for the part are pneumatically unlocked, which restores those cups 78 to their lowered or fully extended Z position while leaving those unneeded cups locked at the raised non-touching position relative to the part. As the end-effector 40 begins touching the part, each unlocked vacuum cup 78 self adjusts in its own Z position and angular orientation to conform to the contour of the part.

As soon as all of the needed vacuum cups 78 are in full contact with the part, the compressed air is discharged again to lock the vacuum cups 78 in their individual Z positions. Lastly, the vacuum is activated on all the needed cups 78 to hold and move the part. Although the vacuum cups 78 seem to be able to float on the ball joint 124, each vacuum cup 78 is effectively locked by the solid work piece as long as at least three separated cups are in action. The different planes of cup rotation counter each other's movement. The end-effector 40 will, however, become unstable only when all of the vacuum cups are on the same line of the frame 46, which is rare and avoidable.

U.S. Patent Application Publication No. 2009/0288458, Ser. No. 12/125,704, filed May 22, 2008, titled Integrated Locking Assembly for Reconfigurable End-Effectors, assigned to the assignee of this application and herein incorporated by reference, discloses an integrated locking assembly including both linear and rotary locking mechanisms that can be used in place of the integrated locking assembly 70, and is generally described below.

Figure 4:
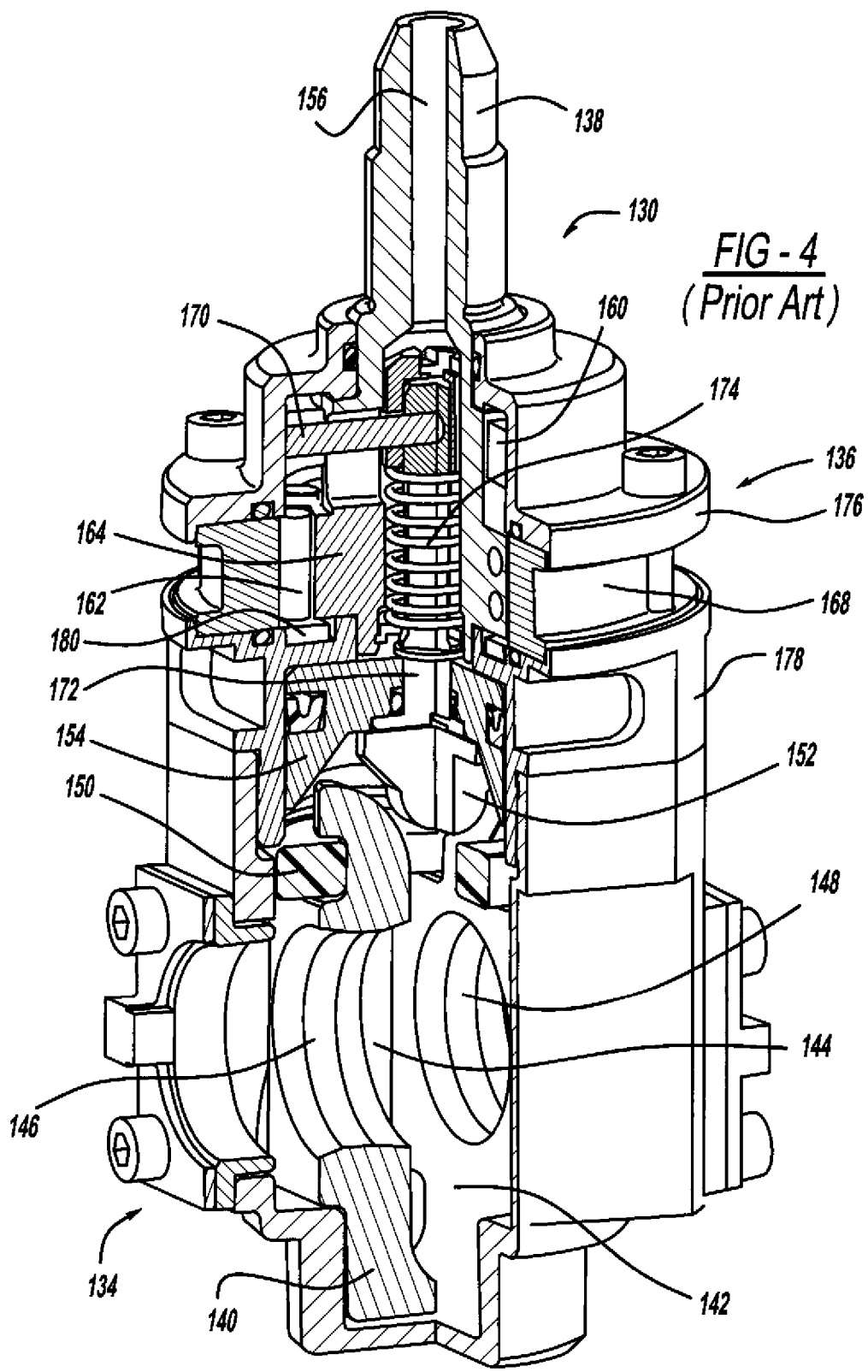
FIG. 4 is a partial cross-sectional view of an integrated rotary and linear locking assembly for a tool module.

FIG. 4 is a cross-sectional view of a locking assembly 130 to be mounted to a shaft (not shown) of an end-effector, such as the end-effector 40. The locking assembly 130 includes a linear locking mechanism 134 and a rotary locking mechanism 136. The linear locking mechanism 134 locks to the shaft, and the rotary locking mechanism 136 locks to an output shaft 138. The linear locking mechanism 134 includes opposing locking plates 140 and 142 defining a gap 144 therebetween, and including bores 146 and 148, respectively. An annular spring 150 pushes ends of the plates 140 and 142 together, as discussed above, and a separating member 152 separates the plates 140 and 142 against the bias of the spring 150 to unlock the linear locking mechanism 134. Using pneumatic air pressure provided through a bore 156 in the shaft 138, a piston 154 is pushed down against the separating member 152 to provide the unlocking actuation.

The rotary locking mechanism 136 includes an actuation plate 160, a plurality of rollers 162, a cam 164 that is an integral feature of the shaft 138 and a middle housing 168. Through a cross-pin 170 and an oblong plunger 172, the actuation plate 160 is coupled to the piston 154 such that the rotary locking mechanism 136 can be locked and unlocked at the same time as the linear locking mechanism 134. A helical compression spring 174 assists the annular spring 150 in returning both of the locking mechanisms 134 and 136 to the locked position. The middle housing 168, made from a heat treated wear resistant material, is sandwiched and bolted together between an upper housing 176 and a lower housing 178 to form the integrated locking assembly 130.

The rotary locking mechanism 136 includes opposing angled members one of which is shown at 180. The angled member 180 is rigidly coupled to the actuation plate 160 and the opposing angled member is free to rotate in the lower housing 178. When pressure is applied downward on the piston 154 and in turn the plate 160, an angled edge of the angled member 180 rides along an angled edge of the opposing angled member, which pushes the angled members into the rollers 162 on both sides against the bias of springs (not shown), extending through a key (not shown), so as to allow the cam 164 to rotate. When the pressure is released, the plate 160 is raised up with the piston 186 through the returning force of the helical spring 174 and the annular spring 150. The angled members are thus separated, allowing the springs to push the rollers 162 back into the locking position. A pair of oblong holes (not shown) in the plate 160 and around the ends of the cross-pin 170 provides the space for the angled member 180 to rotate and push the rollers 162 on its side as the other angled member does on the other side.

The linear locking mechanism 134 and the rotary locking mechanism 136 are serially connected, i.e., are aligned in a row. Serially connected linear and rotary locking mechanisms increase the height of the device relative to the guide rail for the locking device. In other words, the stacked configuration of the linear and rotary locking mechanisms causes the device to have a large height to base ratio, which creates a significant torque on the guide rail that the device is mounted to. As a result, even when the linear locking mechanism is unlocked, the torque tends to tip the locking device housing on the guide rail, which in turn generates a high reaction force at the edge contacts, causing the housing to act as a locking device, and thus prohibiting the intended sliding of the device along the rail.

Also, linear and rotary actuation locking devices are typically designed with anti-rotation keys on both end faces along the guide rail, which includes mating key-ways for keeping the device from turning around a guide rail with circular cross-section. The coupling of keys and key-ways increases the binding effect of the aforementioned tipping moment of force with more sharp contact edges.

The present invention addresses the above drawbacks by separating the linear and rotary locking mechanisms and mounting them on different sides of the device housing to significantly reduce the height of the device and decrease its height to base ratio. A ball spline is used as the guide rail and the whole device assembly is built on a ball spline carrier that has ball bearings riding along the spline grooves to prevent the locking device from turning as well as to ensure smooth sliding of the device under the tipping moment caused by the height of the device.

Figure 5:
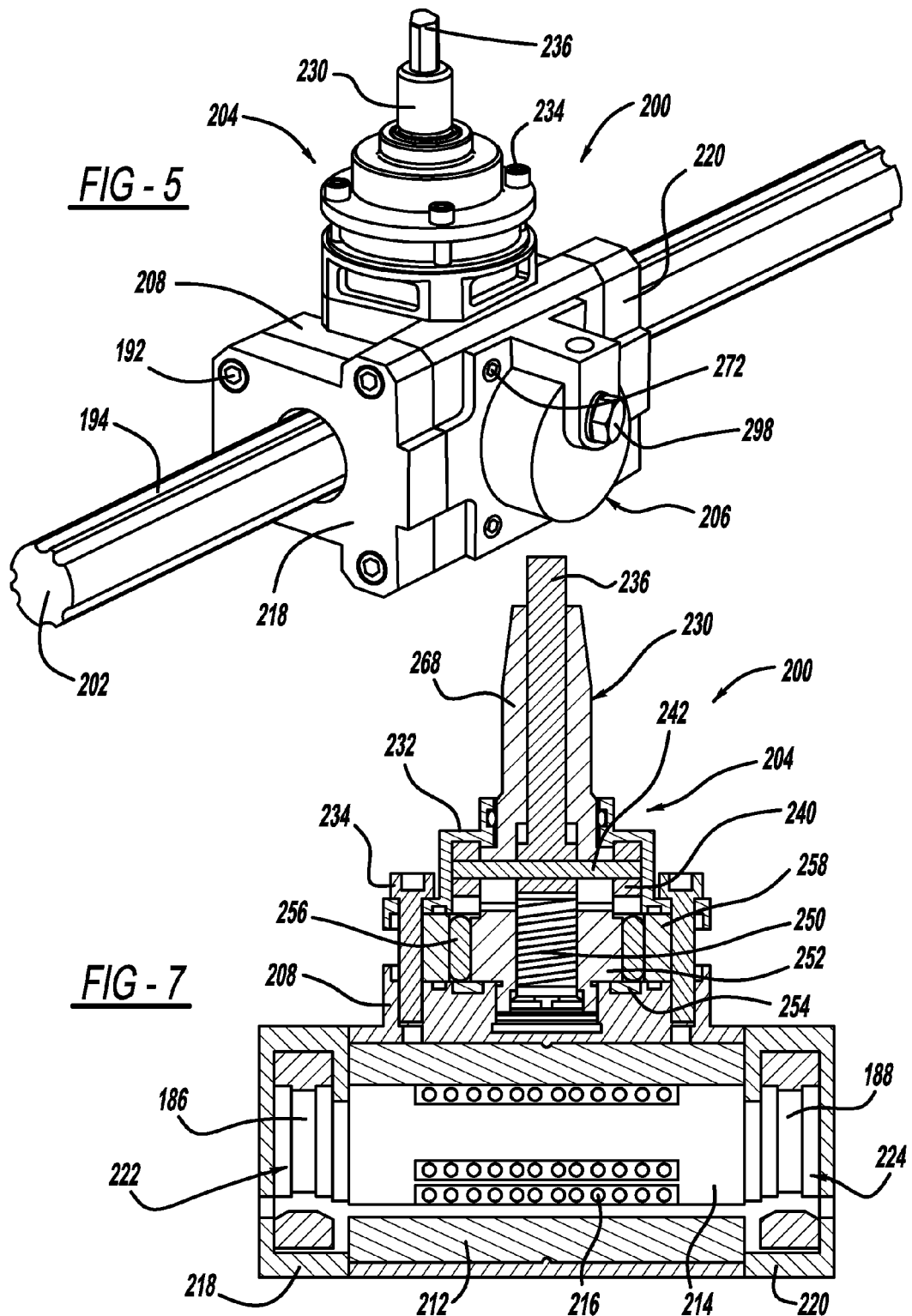
FIG. 5 is a perspective view of an integrated rotary and linear locking device for a tool module.
Figure 6:
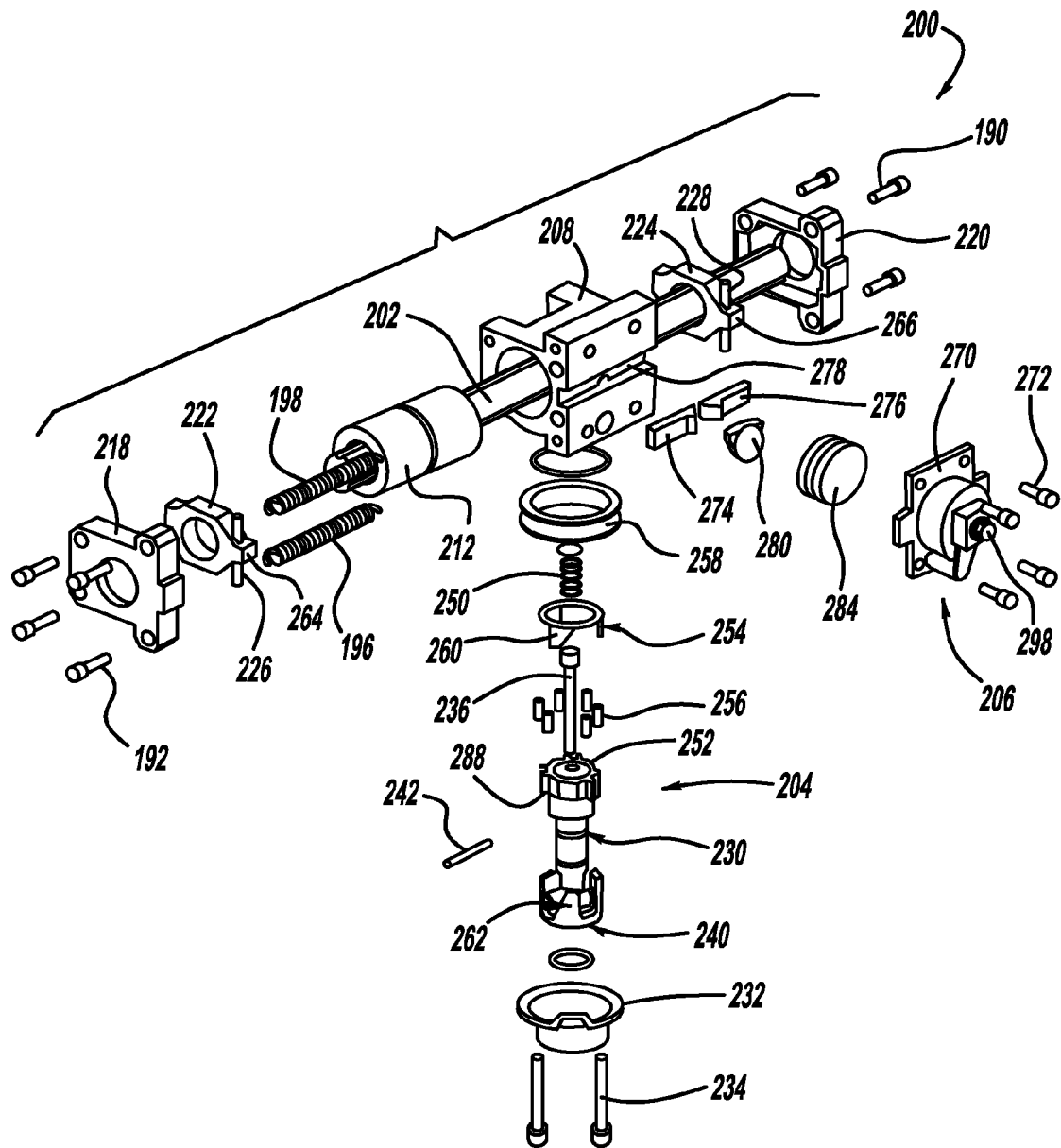
FIG. 6 is an exploded perspective view of the locking device shown in FIG. 5.
Figure 8:
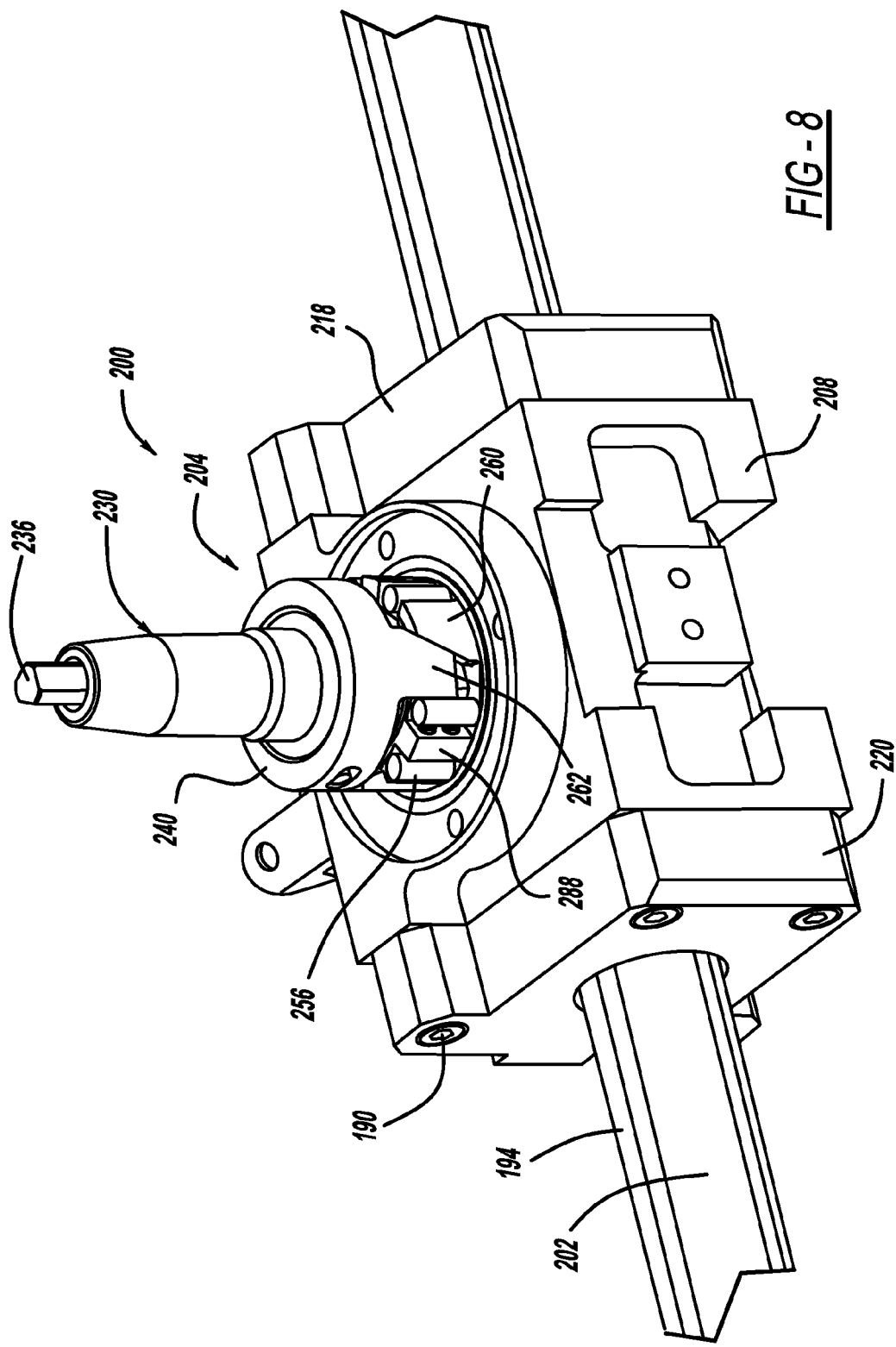
FIG. 8 is a perspective view of the locking device shown in FIG. 5 with a cover removed from the rotary locking mechanism.
Figure 9:
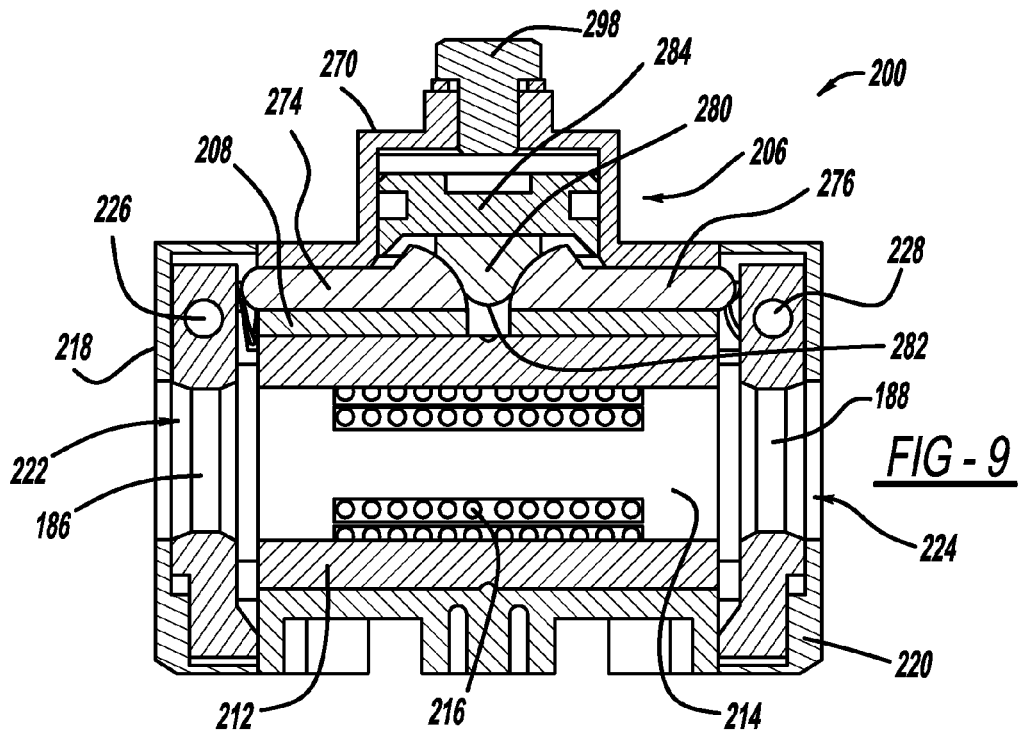
FIG. 9 is a cross-sectional view along a center plane of a linear locking mechanism in the locking device shown in FIG. 4.
Figure 11:
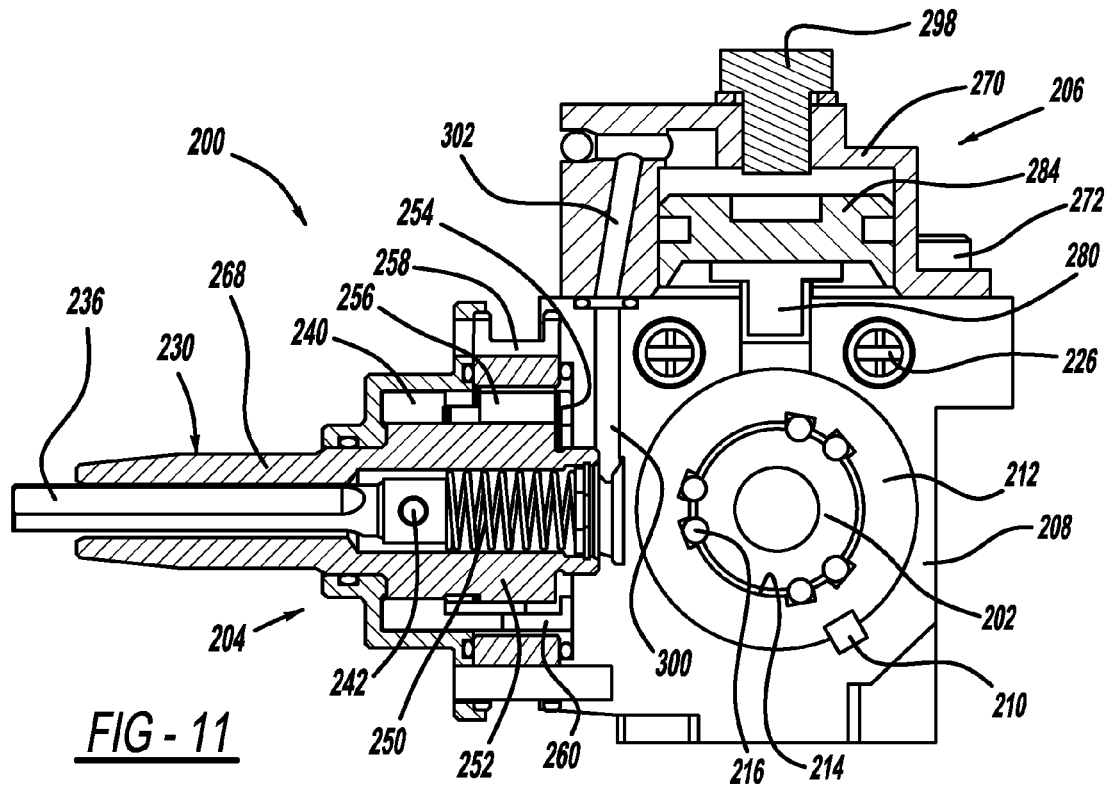
FIG. 11 is a multi-sectional view of the locking device shown in FIG. 5.
Figure 10:
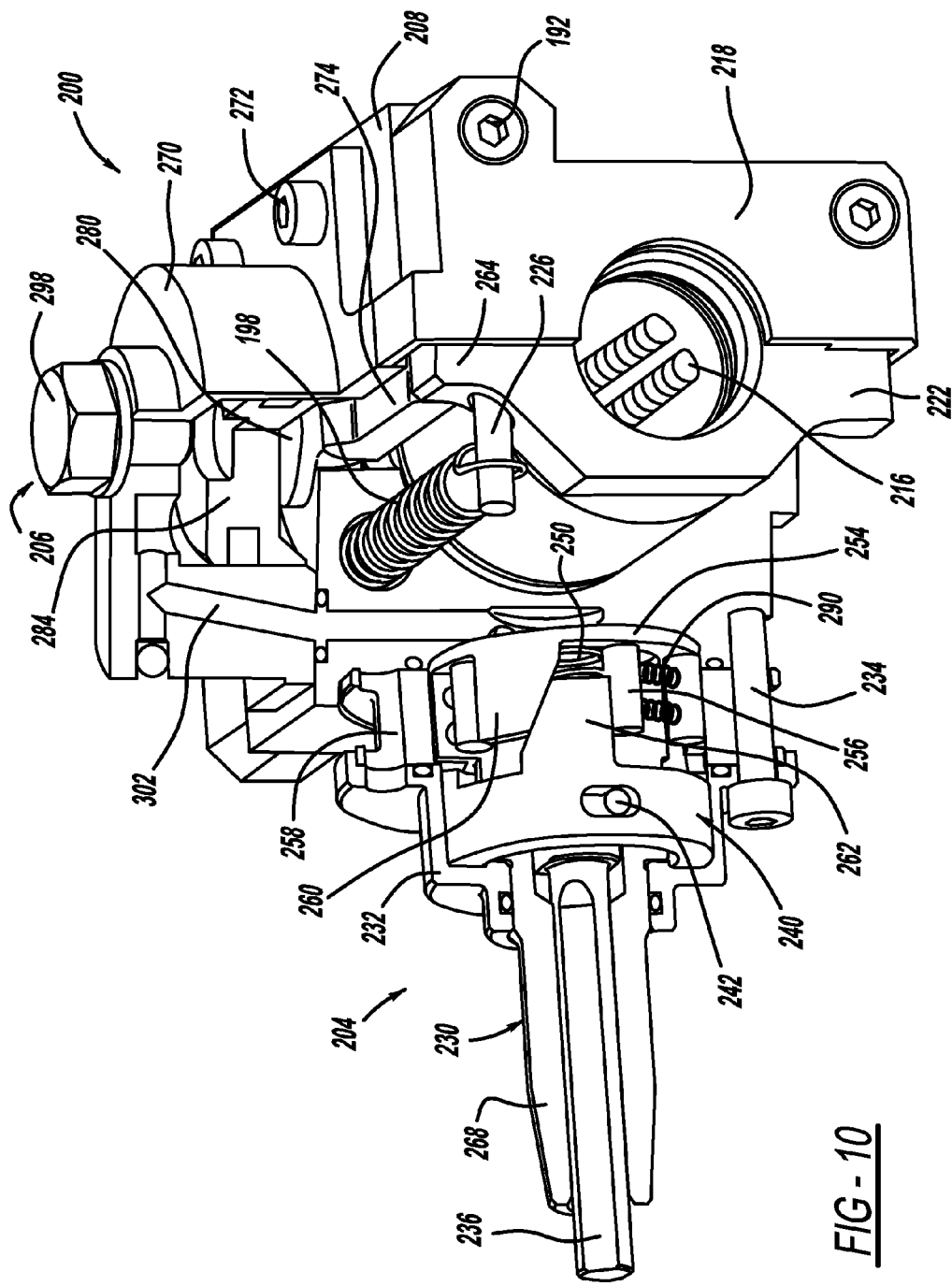
FIG. 10 is a cut-away, perspective view of the locking device shown in FIG. 5.

FIG. 5 is a perspective view and FIG. 6 is an exploded view of an integrated locking device 200 shown mounted to a shaft or ball spline rail 202 including channels 194 extending along the length of the rail 202. The device 200 includes a rotary locking mechanism 204, where FIG. 7 is a cross-sectional view along a center plate of the rotary locking mechanism 204 and the ball spline rail 202, and a linear locking mechanism 206, where FIG. 9 is a cross-sectional view along a center plate of the linear locking mechanism 206. FIG. 8 is a perspective view of the locking device 200 with a cover of the rotary locking mechanism 204 removed, FIG. 10 is a cut-away perspective view of the locking device 200, and FIG. 11 is a multi-sectional view of the locking device 200 showing device air passages.

The rotary locking mechanism 204 and the linear locking mechanism 206 are mounted to and within a housing 208, where the rotary locking mechanism 204 and the linear locking mechanism 206 are separated and built on different sides of the housing 208 to reduce the height and decrease the height to base ratio of the device, as will be discussed in detail below.

A spline carrier 212 is positioned within and extends through the housing 208, where a key 210 prevents the spline carrier 212 from rotating within the housing 208. An internal bore 214 of the spline carrier 212 includes rows of ball bearings 216 where the spline rail 202 extends through the spline carrier 212 so that the bearings 216 are positioned within channels 194 in the rail 202 so that the housing 208 is easily slidable along the rail 202 and the device 200 is prevented from rotating on the spline rail 202. In this non-limiting embodiment, the spline rail 202 includes three groups of two channels that accept six rows of the ball bearings 216. It will be understood by those skilled in the art that the ball spline rail 202 is not the only choice for a guide rail to keep the locking device 200 from turning. Any suitable non-round shaft can be used for this purpose. However, to ensure smooth and accurate sliding, the locking device 200 should still ride on a bearing carrier similar to the one described above.

A first end cap 218 is mounted to the housing 208 at one end of the spline carrier 212 by bolts 192 and a second end cap 220 is mounted to the housing 208 at an opposite end of the spline carrier 212 by bolts 190, as shown. A canting plate 222 is pivotally mounted within the end cap 218 and a canting plate 224 is pivotally mounted within the end cap 220, where the spline 202 extends through bores 186 and 188, respectively, in the canting plates 222 and 224. The canting plates 222 and 224 include tabs 264 and 266, respectively, that receive pins 226 and 228, respectively. The canting plates 222 and 224 are coupled together by a pair of extension springs 196 and 198 that are coupled to ends of the pins 226 and 228 and act to draw the canting plates 222 and 224 together. The extension springs 196 and 198 cause opposing edges of the canting plates 222 and 224 to be pivoted towards each other so that the canting plates 222 and 224 bind or lock on the spline rail 202 and prevent the device 200 from sliding along the rail 202 in the same manner as discussed above for the locking assembly 130.

A rotary shaft 230 is coupled to the rotary locking mechanism 204 where the rotary locking mechanism 204 prevents or allows the shaft 230 to rotate. The rotary shaft 230 includes an elongated portion 268 and a specially configured cam portion 252 discussed in more detail below. The rotary locking mechanism 204 includes a cover member 232 that is bolted to the housing 208 by bolts 234. The rotary shaft 230 extends through the cover member 232, as shown, and an actuation rod 236 extends through an internal bore of the shaft 230. An actuation ring 240 having angled members 262 is positioned within the cover member 232. A securing rod 242 extends across the mechanism 204 and couples the actuation ring 240 to the actuation rod 236. In this non-limiting embodiment, the actuation rod 236 has a triangular shape to allow airflow around it. A spring 250 is positioned within a chamber in the cam portion 252 of the shaft 230 and provides a bias between an end of the actuation rod 236 and the housing 208. A driven ring 254 including angled members 260 rotates in the housing 208. A housing ring 258 extends around the cam portion 252 and is bolted to the housing 208 by the bolts 234.

The cam portion 252 of the shaft 230 includes tab portions 288 having springs 290 that extend therethrough. The springs 290 contact roller bearings 256 and force them into a wedging position between the housing ring 258 and the cam portion 252 that prevents the cam portion 252, and thus the shaft 230, from rotating. The combination of the actuation ring 240 with the angle members 262, the driven ring 254 with the angled members 260, the cam portion 252, the housing ring 258 and the roller bearings 256 operate in the same manner as the same components in the rotary locking mechanism 134 discussed above and in the '704 application.

The rotary locking mechanism 204 operates mechanically instead of pneumatically like the rotary locking mechanism 136 discussed above. Particularly, when the rotary locking mechanism 204 is in the locked configuration, the angled members 260 and 262 are separated and the roller bearings 256 are pushed by the springs 290 to a location where they force the cam portion 252 into the ring housing 258 and prevent the shaft 230 from rotating within the locking device 200. By applying a force to the actuation rod 236 against the bias of the spring 250, the rod 242 causes the actuation ring 240 to move towards the driven ring 254 so that the angled members 262 contact the angled members 260. The angled members 260 and 262 push the roller bearings 256 against the bias of the springs 290 and move them to their unlocked position where the roller bearings 256 do not lock the cam portion 252 to the ring housing 258. This allows the cam portion 252 to rotate, which allows the shaft 230 to rotate.

The linear actuation mechanism 206 includes an air cylinder member 270 mounted to the housing 208 by bolts 272 and opposing push rods 274 and 276 mounted within a slot 278 in the housing 208. A wedge member 280 is positioned within a gap 282 between the push rods 274 and 276. A piston 284 is positioned within the air cylinder member 270 and holds the wedge member 280 in place. A maintenance cap 298 is provided in the air cylinder member 270 to gain access thereto for maintenance purposes.

The housing 208 includes an air passage 300 that is in fluid communication with an air passage 302 in the air cylinder member 270. A pneumatic system (not shown) provides air pressure to the internal bore of the rotary shaft 230 around the actuation rod 236 that flows through the rotary locking mechanism 204 and enters the air passage 300. The air flows from the air passage 300 into the air passage 302 and applies pressure to a top surface of the piston 284. The piston 284 applies a force against the wedge member 280 so that it pushes farther into the gap 282 causing the push rods 274 and 276 to separate against the force of the springs 196 and 198. The push rods 274 and 276 are in contact with the tabs 264 and 266 of the canting plates 222 and 224, respectively, where separation of the push rods 274 and 276 causes the canting plates 222 and 224 to tilt against the bias of the springs 196 and 198 and become parallel to each other so that they do not bind on the rail 202. Thus, the housing 208 can slide on the spline rail 202.

Although this invention, with its requirements for secure locking, smooth sliding and precision guiding, is mainly targeted for robotically reconfigurable tooling applications, the concepts and ideas are equally applicable to manually assembly flexible tooling, or an end-effector or fixture, that needs be reconfigured.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. An integrated locking device comprising:
   a housing member including a plurality of sides;
   a linear locking mechanism including opposing canting plates having aligned bores that can lock onto a shaft extending through the bores, said linear locking mechanism being mounted to one side of the housing member; and
   a rotary locking mechanism including an output shaft, said rotary locking mechanism mounted to a different side of the housing member than the linear locking mechanism is mounted to, wherein the rotary locking mechanism includes an actuation ring and a spring, where the spring biases the actuation ring to a locking position and pressure applied to the actuation ring against the bias of the spring causes angled members on the actuation ring to push against angled members on a driven ring so that the angled members apply a force against the rollers to push the rollers into the open position.

2. The device according to claim 1 wherein the rotary locking mechanism includes rollers positioned between a fixed housing and a cam, said rollers being wedged between the fixed housing and the cam to lock the rotary locking mechanism and being positioned in an open position between the fixed housing and the cam to unlock the rotary locking mechanism.

3. The device according to claim 1 further comprising an actuation rod extending through a bore in the shaft, said actuation rod applying pressure against the spring to cause the angled members to engage and unlock the rotary locking mechanism.

4. The device according to claim 1 wherein the linear locking mechanism includes springs that draw the canting plates together in a locked position and push rods that that push against the canting plates and the bias of the springs to position the canting plates in an unlocked position.

5. The device according to claim 4 wherein the linear locking mechanism includes a piston that pushes against a wedge member to separate the rods to apply pressure against the canting plates in response to air pressure.

6. The device according to claim 1 wherein the housing includes a spline carrier having an internal bore and ball bearings mounted thereon, said shaft being a spline shaft having channels, said spline carrier operable to accept the spline shaft so that the ball bearings are mounted within the channels.

7. The device according to claim 6 wherein end plates are mounted to ends of the spline carrier.

8. The device according to claim 1 wherein the integrated locking device is part of a tool module attached to an end-effector for a robot.

9. An integrated locking device comprising:
a housing member including a plurality of sides;
a spline carrier mounted within the housing and having an internal bore and ball bearings mounted thereon for accepting a spline shaft;
a pair of opposing canting plates mounted to opposite ends of the spline carrier, said canting plates having aligned bores for accepting the spline shaft and being pivotable to lock onto the spline shaft;
a linear locking mechanism including push rods in contact with the canting plates, said linear locking mechanism being mounted to one side of the housing member; and
a rotary locking mechanism including an output shaft, said rotary locking mechanism including rollers positioned between a fixed housing and a cam, said rollers being wedged between the fixed housing and the cam to lock the rotary locking mechanism and being positioned in an open position between the fixed housing and the cam to unlock the rotary locking mechanism, said rotary locking mechanism being mounted to a different side of the housing than the linear locking mechanism is mounted to.

10. The device according to claim 9 wherein the rotary locking mechanism includes an actuation ring and a spring, where the spring biases the actuation ring to a locking position and pressure applied to the actuation ring against the bias of the spring causes angled members on the actuation ring to push against angled members on a driven ring so that the angled members applies a force against the rollers to push the rollers into the open position.

11. The device according to claim 10 further comprising an actuation rod extending through a bore in the shaft, said actuation rod applying pressure against the spring to cause the angled members to engage and unlock the rotary locking mechanism.

12. The device according to claim 9 wherein the linear locking mechanism includes springs that draw the canting plates together in a locked position and push rods that push against the canting plates and the bias of the springs to position the canting plates in an unlocked position.

13. The device according to claim 12 wherein the linear actuation mechanism includes a piston that pushes against a wedge member to separate the rods to apply pressure against the canting plates in response to air pressure.

14. The device according to claim 9 wherein end plates are mounted to ends of the spline carrier.

15. The device according to claim 9 wherein the integrated locking device is part of a tool module attached to an end-effector for a robot.

16. An integrated locking device comprising:
a housing member including a plurality of sides;
a spline carrier mounted within the housing and having an internal bore and ball bearings mounted thereon for accepting a spline shaft;
a pair of opposing canting plates mounted to opposite ends of the spline carrier, said canting plates having aligned bores for accepting the spline shaft and being pivitable to lock onto the spline shaft;
a linear locking mechanism including push rods in contact with the canting plates, the linear locking mechanism being mounted to one side of the housing member, said linear locking mechanism including springs that draw the canting plates together in a locked position and the push rods that push against the canting plates and the bias of the springs to position the canting plates in an unlocked position, said linear locking mechanism further including a piston that pushes against a wedge member to separate the rods to apply pressure against the canting plates in response to air pressure; and
a rotary locking mechanism including an output shaft, said rotary locking mechanism mounted to a different side of the housing member than the linear locking mechanism is mounted to.

17. The device according to claim 16 wherein the rotary locking mechanism further includes rollers positioned between a fixed housing and a cam, said rollers being wedged between the fixed housing and the cam to lock the rotary locking mechanism and being positioned in an open positioned between the fixed housing and the cam to unlock the rotary locking mechanism, said rotary locking mechanism further including an actuation ring and a spring, where the spring bias the actuation ring to a locking position and pressure applied to actuation ring against the bias of the spring causes angled members on the actuation ring to push against angled members on driven ring so that the angled members apply a force against the rollers to push the rollers into the open position.

18. The device according to claim 17 further comprising an actuation rod extending through a bore in the shaft, said actuation rod applying pressure against the spring to cause the angled members to engage and unlock the rotary locking mechanism.

19. The device according to claim 16 wherein the integrated locking device is part of a tool module attached to an end-effector for a robot.

* * * * *